United States Patent [19]
Williams

[11] 3,869,415
[45] Mar. 4, 1975

[54] RESINOUS POLYMER CONTAINING WATERPROOFING PLASTER COMPOSITIONS

[75] Inventor: John Williams, Maidstone, England

[73] Assignee: Temec Limited, Wembley, England

[22] Filed: Aug. 14, 1973

[21] Appl. No.: 388,143

Related U.S. Application Data

[63] Continuation-in-part of Ser. No. 106,900, Jan. 15, 1971, abandoned, which is a continuation-in-part of Ser. No. 727,037, May 6, 1968, abandoned.

[30] Foreign Application Priority Data
Apr. 4, 1968 Great Britain..................... 16352/68
Jan. 16, 1970 Great Britain..................... 0276/70

[52] U.S. Cl................ 260/17 R, 106/93, 106/94, 260/29.6 S, 260/29.7 S, 260/14
[51] Int. Cl................... C08f 45/04, C08f 45/24
[58] Field of Search......... 260/29.6 S, 29.7 S, 17 R, 260/14

[56] References Cited
UNITED STATES PATENTS

| | | | |
|---|---|---|---|
| 2,514,637 | 7/1950 | Goldstein........................ | 260/29.6 S |
| 2,776,914 | 1/1957 | Faulwetter...................... | 260/29.6 S |
| 2,986,544 | 5/1961 | Driscoll ......................... | 260/29.7 S |
| 3,112,681 | 12/1963 | Gessler et al. .................. | 260/42.13 |
| 3,228,907 | 1/1966 | Eash................................ | 260/29.7 S |
| 3,240,736 | 3/1966 | Beckwith ..................... | 260/29.2 EP |
| 3,297,617 | 1/1967 | Regenstein et al. ............ | 260/29.6 S |
| 3,538,036 | 11/1970 | Peters et al...................... | 260/29.6 S |

*Primary Examiner*—Lucille M. Phynes
*Attorney, Agent, or Firm*—Stewart and Kolasch

[57] ABSTRACT

A plaster composition having water-resistance properties comprising 30 to 60% by weight of calcium sulfate plaster solids, 0.25 to 15% by weight of a waterproofing resin selected from the group consisting of vinyl toluene-butadiene copolymers, polyvinyl chloride, polyvinyl acetate, petroleum and coal tar hydrocarbon polymer resins and styrene and acrylic copolymers, 4 to 48% of an organic solvent for said resin and 20 to 50% by weight of water. The composition preferably includes a cellulose ether suspending agent for the resin solution. Up to 50% by weight of the plaster solids may be replaced by a hydraulic cement.

23 Claims, No Drawings

RESINOUS POLYMER CONTAINING WATERPROOFING PLASTER COMPOSITIONS

This application is a continuation-in-part of the now abandoned application Ser. No. 106,900, filed Jan. 15, 1971, which, in turn, is a continuation-in-part of application Ser. No. 727,037, filed on May 6, 1968, now abandoned.

The present invention relates to a composition and method for the integral waterproofing of plaster compositions and the like. More particularly, it relates to the incorporation of certain resinous polymers into plaster compositions in order to render them waterproof.

Plaster is a well known composition in the art; note, for example, the discussion in the Kirk-Othmer Encyclopedia of Chemical Technology, Vol. 3, 1949 (The Interscience Encyclopedia, Inc., New York), pages 441–445. A plaster is a mortar in which the binder is usually gypsum (various forms of calcium sulfate) or a mixture thereof with natural or Portland cement. Plaster compositions are widely used in the construction industry.

Plaster compositions up to the present time have had the disadvantage of having an affinity for moisture and this eventually leads to the disintegration of the plaster. With the rapid expansion of industrialized construction the need has arisen for perfectly shaped light-weight, fire resistant, high insulation units with varying rheological properties. To obtain these properties the plaster composition solids suitably comprise a cementitious form of calcium sulfate with non-cementitious fillers such as siliceous aggregates, calciferous mineral powders, exfoliated mica, expanded clay, pumice, cork, all types of natural and synthetic fibers, including hessian fiber, polynosic and polyester fibers, nylon fibers, glass fibers, asbestos fibers and the like. The cementitious calcium sulfate includes, for example, anhydrous calcium sulfate, calcium sulfate, dihydrate and/or chemical gypsum, commonly called synthetic gypsum, as well as calcium sulfate hemihydrate.

In order to create a more rapid drying of the set plaster compositions under normal ambient conditions hydraulic cement can be added or used as a partial replacement for the plaster solids, as noted above. The cements which can be employed for this purpose are conventional hydraulic cements such as Portland cement; Ciment fondu; Roman cement, made by heating of a mixture of limestone and clay; Titan cement, made by fusing a mixture of Titaniferous iron ore, limestone and coke; Keene's cement, produced by the recalcination of calcined gypsum; and calcium aluminate cement, produced by heating a mixture of bauxite and limestone and Pozzolanic, a natural cement of volcanic origin. The term "cement" may be defined as a substance which, when mixed with a proportion of water, hydrates to form a hard tenacious mass. Various cement products are discussed in, for example, the Kirk-Othmer Encyclopedia cited above, Volume 3.

Conventional accelerators and retarding agents can be used to react with both the cement and the plaster solids if required, for example, potassium sulfate, sodium citrate, alum, calcium chloride, etc. If necessary, surface-active agents such as the alkyl-aryl sulfonates can be used for assisting the wetting-out of a surface if the plaster composition is to be applied in situ and to improve the wetting-out of the plaster composition solids during mixing. Other specific properties can be achieved by adding freeze resistant agents, antibacterial agents, natural and synthetic colloidal clays and the like to the composition. Furthermore, the set plaster compositions can be varied in density by adding foaming or de-foaming agents thereto.

It is clearly desirable for plaster compositions to have water-resistance properties because such properties widen the scope of application of such compositions, particularly when subjected to external weathering or when used as infill and cladding panels. Furthermore, water-resistant plasters can be reinforced with steel and various fabrics, which would otherwise be prone to rust or deteriorate when subjected to prolonged contact with moisture. Such reinforced plaster compositions then lend themselves to use as load-bearing units, which can be prestressed if desired. Normally, gypsum plasters lose up to twothirds of their compressive strength when wet, however, when waterproofed, little or no loss of strength occurs. For these reasons, a considerable amount of work has been previously carried out by other workers in attempts to develop plaster compositions which are waterproof but without notable success.

Accordingly, one of the objects of the present invention is to provide plaster compositions which are water-resistant and, thus possess a greater scope of applicability than the prior art compositions.

Another object of the invention is to provide a simple method for rendering plaster compositions, with or without additional fillers or additives, water-resistant without detracting from the desirable and beneficial properties thereof.

These and other objects and advantages of the present invention will become apparent to those skilled in the art from a consideration of the following specification and claims.

It has now been found, in accordance with the present invention, that a plaster or like composition can be given water-resistance properties by incorporating therein a resin and a solvent therefor. This can be achieved by including in the wetted-out plaster composition a solution of the resin in an organic solvent. In the preferred forms of the invention, an aqueous solution of a substituted cellulose derivative is also included in the composition as a suspending agent.

The resin solution can first be dispersed by mechanical means into the aqueous solution of the substituted cellulose, creating an emulsion, before incorporation into the plaster composition, or both solutions can be incorporated separately. The principal function of the substituted cellulose is to assist in keeping the resin solution in suspension while the plaster mix is in a fluid state and until it sets. The cellulose constituent also provides for improved adhesion to substrates and acts as a suction inhibitor when the plaster compositions are applied in situ; it has also been found to confer on the set plaster compositions a high degree of resistance to solvents, oils and greases. Substituted cellulose derivatives suitable as additives to the plaster compositions of this invention include carboxy ethers of cellulose and lower alkyl-substituted celluloses such as sodium carboxymethyl cellulose, hydroxypropyl cellulose, hydroxyethyl methyl cellulose, ethylhydroxyethyl cellulose and hydroxyethyl cellulose. Salts of carboxy ethers can only be used with lime-free compositions since insoluble calcium salts will be formed in the presence of lime.

Substituted cellulose derivatives used with success in this invention include commercially available products sold under such trade names as Tylose, Methofas, Modocoll 'E', Natrasol, and Celacol. The concentration of the substituted cellulose derivative employed is normally 0.125% to 3% by weight with respect to the plaster solids. Other suspending agents such as natural or synthetic clays (e.g., bentonite or lapinite) can be used to wholly or partially replace the substituted cellulose derivative, if desired.

The resin is used in the compositions of this invention to impart water-resistance to the set compositions. A number of hydrophobic natural, synthetic and modified resins can be used for this purpose, e.g., ester gums, maleic anhydride modified rosin, phenol/formaldehyde modified rosin, rosin Ca/Zn-resinate, copolymers of styrene, vinyltoluene/butadiene copolymers, polyvinyl chloride, polyvinyl acetate, acrylic copolymers, and petroleum and coal tar hydrocarbon resins. The most suitable resins are the hydrocarbon resins such as polyindene, which is produced by the polymerization of unsaturates derived from the deep cracking of petroleum, or coumarone-indene resins derived from the coal tar naphtha fraction boiling between 168°C and 175°C. The preferred resins used for this invention are hard solids at ambient temperatures and have a low molecular weight with melting points between 80°C and 140°C (ring and ball); they are also neutral and unsaponifiable. They are furthermore capable of producing solutions of low viscosity with a high resin solids content when dissolved in an appropriate solvent and are highly resistant to alkali and to any change caused by atmospheric exposure. The resins used include those commercially sold under the trade names Piccopale, Panarex, Necires, Lindene, Gebagan, Piccotex, Pentalyn, Pioneer, Vinoflex, Vinalak, Plexigum, Pliolite, Beckacite and Epok.

The solvent used for said resin is preferably substantially completely immiscible with water and must be powerful enough to dissolve a large amount of resin. The evaporation rate of the solvent should desirably be substantially the same as that of the water within the composition. If the evaporation rate is too slow, the surface of the set plaster composition is likely to be sticky as a result of the solvent having a prolonged fluxing effect on the resin of the plaster composition; moreover, trapping of the solvents within the plaster composition would result in an unacceptable time for the plaster to reach a fully dried out state. If the evaporation rate of the solvent is too rapid, precipitation of the resin would occur and a discontinuous resin film would be formed within the structure of the set plaster composition, thereby reducing the full effect of the water-resistance. Because the plaster compositions are likely to be compounded in enclosed conditions, the solvent chosen should have a low toxicity. Aliphatic and aromatic hydrocarbons have been found to be particularly suitable, the most suitable being the aliphatic hydrocarbon solvents which have special boiling point fraction numbers 1-8 (for a description of 'Special Boiling Points' see Part 2 of 'Paint Technical Manuals' Chapman and Hall, page 232). Coal tar distillate fractions, e.g., thiophene-free xylene, can also be used. Organic solvents having boiling points of about 120° to 210°C., advantageously from 138° to 181°C., are quite suitable in the compositions of this invention. For example, xylene, a very suitable aromatic hydrocarbon solvent, has a boiling point range of 138° to 142°C., and Caromax has a boiling point range of 161° to 181°C. Other useful solvents include naphthas (b.p. 120° C. and higher) and white spirits (b.p. about 210°C.). Hence, aliphatic and aromatic hydrocarbons having boiling points in these ranges, and particularly from 168° to 175°C., are preferably employed in the compositions of the invention.

The resin to organic solvent ratio should be such that the viscosity of the resulting solution permits easy emulsification when it is added to the aqueous solution of the substituted cellulose derivative or when it is added per se as an ingredient to the aqueous plaster composition. The resin/solvent ratio will also depend on the desired properties of the plaster composition. Typical examples are:

| | | | |
|---|---|---|---|
| 1. | Polyindene resin (mol wt. 800–900)(Panarez) | 37 | parts by weight |
| | Organic solvent (Special Boiling Point No. 6) (b.p. 140–165°C.) | 63 | do. |
| 2. | Coumarone-indene resin (mol wt. 900–1100) (Necires R.F. 100) | 50 | parts by weight |
| | Commercially pure xylene | 50 | do. |

The resin concentration of the compositions can be varied to achieve varying degrees of water-resistance, for example, ranging from 4% to 37.5% by weight with respect to the plaster solids.

The following is an example of the resin being emulsified into the cellulose derivative prior to incorporation into the plaster mix:

Part A
| | |
|---|---|
| Ethyl hydroxyethyl cellulose (Modocoll E) — medium viscosity range | 1.0% |
| Water | 78.0% |

Part B
| | |
|---|---|
| Hydrocarbon resin (Necires L.F. 220/100) (Melting point 100°C ± 3°C) | 7.0% |
| Thiophene-free xylene | 14.0% |

Part 'B' is emulsified into part 'A' and this mixture is used as the liquid component of the plaster solids composition.

The following examples are given merely as illustrative of the plaster compositions according to the invention and are not to be considered as limiting. Throughout these examples the term "plaster solids" refers to calcium sulfate in its various forms as discussed above, excluding fillers. The substituted cellulose derivatives employed are water-soluble cellulose ethers.

| Example | Percent by weight |
|---|---|
| 1. Liquid phase as in Parts A and B above | 55 |
| Plaster solids | 45 |
| 2. Liquid phase as in Parts A and B above | 40 |
| Plaster solids | 60 |
| 3. Water | 42.50 |
| Methyl hydroxyethyl cellulose (Methofas) — medium viscosity range | 0.5 |
| Thiophene-free xylene | 8.0 |
| Hydrocarbon resin (Piccopale) — (melting point 100°C ± 3°C) | 4.0 |
| Plaster solids | 45.0 |
| 4. Water | 42.875 |
| Hydroxypropyl methyl cellulose (Methofas) | 0.125 |
| Thiophene-free xylene | 8.0 |
| Hydrocarbon resin (Necires) | 4.0 |
| Plaster solids | 45.0 |
| 5. Water | 42.0 |
| Ethyl-hydroxyethyl cellulose (Modocoll E) | 1.0 |
| Commercially pure xylene | 8.0 |
| Oxidized polyindene resin (Panarez) | 4.0 |
| Plaster solids | 45.0 |
| 6. Water | 32.0 |
| Hydroxyethyl cellulose (Natrasol) | 0.375 |
| Hydrocarbon resin (Epok) | 4.0 |
| Commercially pure xylene | 8.0 |
| Plaster solids | 55.625 |
| 7. Water | 45.875 |
| Substituted cellulose derivative (Natrasol) | 0.125 |
| Coumarone-indene resin (Epok) | 2.0 |
| Thiophene-free xylene | 4.0 |
| Plaster solids | 48.0 |
| 8. Water | 42.0 |
| Cellulose derivative (Tylose) | 1.0 |
| Thiophene-free xylene | 6.0 |
| Hydrocarbon resin (Piccopale) | 6.0 |
| Plaster solids | 45.0 |
| 9. Water | 43.0 |
| Commercially pure xylene | 8.0 |
| Hydrocarbon resin (Lindene) | 4.0 |
| Plaster solids | 45.0 |
| 10. Water | 39.875 |
| Hydroxypropyl methyl cellulose (Methofas) | 0.125 |
| Oxidized polyindene resin (Panarez) | 10.0 |
| Organic solvent (S.B.P. No. 6) | 10.0 |
| Plaster solids | 40.0 |
| 11. Water | 30.0 |
| Thiophene-free xylene | 15.0 |
| Hydrocarbon resin (Epok) | 15.0 |
| Plaster solids | 40.0 |
| 12. Water | 42.875 |
| Ethyl-hydroxyethyl cellulose (Modocoll E) | 0.125 |
| Hydrocarbon resin (Necires) | 4.0 |
| Caromax (an aromatic hydrocarbon solvent; b.p. 161–181°C.) | 8.0 |
| Plaster solids | 22.5 |
| Portland Cement | 22.5 |
| 13. Water | 30.0 |
| Hydrocarbon resin (Piccopale) | 15.0 |
| Plaster solids | 30.0 |
| Xylene | 15.0 |
| Portland Cement | 10.0 |
| 14. Water | 42.875 |
| Substituted cellulose derivative (Modocoll) | 0.125 |
| Aliphatic hydrocarbon solvent (S.B.P. No. 6) | 8.0 |
| Ester gum | 4.0 |
| Plaster solids | 45.0 |
| 15. Water | 37.25 |
| Substituted cellulose derivative (Natrasol) | 0.25 |
| Organic solvent (S.B.P. No. 6) | 6.25 |
| Hydrocarbon resin (Lindene) | 6.25 |
| Plaster solids | 50.0 |
| 16. Water | 19.75 |
| Cellulose derivative (Modocoll) | 0.25 |
| Xylene (organic solvent) | 47.875 |
| Resin (Necires) | 2.125 |
| Plaster solids | 30.00 |
| 17. Water | 39.75 |
| Cellulose derivative (Tylose) | 0.25 |
| Organic solvent (Caromax) | 4.75 |
| Resin (Piccopale) | 0.25 |
| Plaster solids | 55.00 |
| 18. Water | 37.25 |
| Cellulose derivative (Modocoll) | 0.25 |
| Xylene (organic solvent) | 6.25 |
| Ca/Zn rosinate (Pioneer R24) (Mol. wt. 900–1100) | 6.25 |
| Plaster solids | 50.00 |
| 19. Water | 42.875 |
| Cellulose derivative (Modocoll) | 0.125 |
| Aliphatic hydrocarbon solvent (S.B.P. No. 6) | 8.0 |
| Rosin (Beckacite) | 4.0 |
| Plaster solids | 45.0 |
| 20. Water | 37.875 |
| Hydroxypropyl methyl cellulose (Methofas) | 0.125 |
| Phenol-modified rosin (Epok R 600) | 10.00 |
| Xylene (organic solvent) | 10.00 |
| Plaster solids | 42.0 |

The plaster compositions can be pre-colored to a particular shade of color if required. A fungicide or bactericide can also be incorporated into the pre-dispersed liquids if required to protect the liquids from bacterial attacks during storage. Although the organomercury compounds can be used, it is preferable not to use these compounds as fungicide or bactericide additives because of their high toxicity. Satisfactory fungicides and bactericides include sodium pentachlorophenate, p-chloro-m-cresol, sodium orthophenyl-phenate, terpineol, etc.

Generally speaking, the preferred compositions of this invention comprise the following components in the indicated proportions:

| | Percent by Weight |
|---|---|
| Water | 20 – 50 |
| Substituted cellulose derivative | 0 – 2 |
| Organic solvent | 4 – 48 |
| Polymer resin | 0.25 – 15 |
| Plaster solids | 30 – 60 |
| Cement | 0 – 50 |

(based on the amount of plaster solids)

The following proportions of ingredients have also been found to be suitable and beneficial for obtaining the objectives of the invention:

| | Percent by weight |
|---|---|
| Water | 28.0 – 50.0 |
| Substituted cellulose derivative | 0 – 2.0 |
| Organic solvent | 4.0 – 15.0 |
| Polymer resin | 2.0 – 15.0 |
| Plaster solids | 38.0 – 60.0 |
| Cement | 0 – 50.0 |

(based on the amount of plaster solids)

The latter formulation may be viewed as constituting preferred ranges of ingredients, however, it is to be understood that the broader proportions given in the former formulation are also quite suitable and effective in providing water-resistant plaster compositions.

The invention is applicable to calcium sulfate plaster compositions or plaster and cement mixtures. While Portland cement does not deteriorate under conditions of moisture, such mixes tend to shrink upon final drying. Therefore, they do not lend themselves to perfect shapes when used in molds. Plasters, on the other hand, expand slightly on drying out and remain in this state, thereby reproducing perfect shapes when molded. Moreover, the rapid-setting properties of plaster compositions enable casting molds to be re-used at very much shorter time intervals than with cement compositions, that is to say, in the case of gypsum plasters in about half an hour as opposed to three days or more for cement, resulting in considerable economies in space and capital outlay on molds. A suitable mixture of cement and plaster can be used to produce the required expansion or contraction properties, but any composition containing plaster has heretofore had the disadvantage of lack of resistance to water. The invention is intended primarily to produce casting compositions, but trowelling compositions and the like can also be provided.

It has been observed that the presence of the volatile solvent produces cells in the set product and, thus, a reduction in its density. Such density reductions are particularly useful when they are at least 20% and this corresponds to a solvent percentage of about 5%. If no water-resistant properties are required, a cellular product can be obtained with the resin omitted.

It is envisaged that the composition may be sold in multipart packs and that the components thereof may be sold separately.

Hence, according to one aspect of the invention, there is provided an aqueous calcium sulfate plaster composition having incorporated therein a solid, low molecular weight waterproofing resin selected from the group consisting of vinyl toluene-butadiene copolymers, polyvinyl chloride, polyvinyl acetate, petroleum and coal tar hydrocarbon polymer resins and styrene and acrylic copolymers, the resin being dissolved in a substantially water-immiscible organic solvent which is dispersed in the aqueous phase and which evaporates from the composition at a rate similar to the evaporation rate of water from the composition, the properties of the essential ingredients (disregarding any fillers present) being:

|  | Percent by weight |
|---|---|
| Plaster solids plus cement (the latter if present) | 30 – 60 |
| Resin | 0.25 – 15 |
| Organic solvent | 4 – 48 |
| Water | 20 – 50 | the ratio by weight of cement to plaster solids being not greater than 1:1 (i.e., not greater than 50% by weight with respect thereto). The plaster solids may comprise various forms of calcium sulfate, for example, anhydrous calcium sulfate and/or calcium sulfate hemihydrate.

According to another aspect of the invention, a multi-pack composition is provided in which one of the packs comprises the solid ingredients and another, the water, the organic solvent, the resin and a suspending agent. In a modification of this arrangement, the water is omitted from the second pack.

The invention further provides a liquid component for the composition comprising the water with the solution of the resin in the organic solvent dispersed therein, the weight of the organic solvent being more than a fifth of the weight of the water, and the weight of the resin being more than a tenth of the weight of the water. Alternatively all of the specified ingredients except for the water may be contained in one component of the composition, and the water is then added thereto.

Coumarone-indene resins, one of the preferred resin additives in the present invention, are well known in the art. In this regard reference is hereby made to Chapter 13 of the book "The Chemistry of Commercial Plastics" by Reginald L. Wakeman, particularly pages 286–292 (Reinhold Publishing Corp., New York, 1947). These resins are also disclosed and discussed at pages 176 and 729–732 of the "Handbook of Plastics" by Simonds and Ellis (D. Van Nostrand Co., Inc., New York, 1943). Such resins are derived from coal tar distillates (see H. H. Lowry, "Chemistry of Coal Utilization", Supplemental Volume, John Wiley & Sons, Inc., New York, 1963). Coal tar distillates are a fruitful source of cyclic unsaturates containing the double bond in non-benzenoid rings. Two of these coal tar compounds, coumarone and indene, can be converted to useful resins by reaction with, for example, sulfuric acid. Coumarone and indene both occur in the solvent naptha cuts of coal tar distillates and have boiling points of 172° and 182°C., respectively. Since they are rather difficult to separate from each other, polymerization of the mixture can be effected to give coumarone-indene resins. Of course, the separation can be conducted, if desired, to provide monomeric coumarone or indene which can then be polymerized to paracoumarone or paraindene (polyindene) resins, respectively.

The petroleum resins used in this invention are likewise well known in the art; see, for example, pages 296–299 of "The Chemistry of Commercial Plastics" by Wakeman, cited above. The cracking of petroleum gives an appreciable amount of readily polymerizable unsaturates that can be converted to hydrocarbon resins. Basically, such resins are soluble in both aliphatic and aromatic hydrocarbons and, hence, are ideally suited for use in the present invention.

Ethylenically unsaturated comonomers, such as ethylene, propylene and the like, are used as the copolymerizable component in the styrene and acrylic copolymers mentioned above. The expression "acrylic" copolymers herein is meant to be generic to copolymers of acrylic acid, alkyl acrylates, methacrylic acid and alkyl methacrylates. Such copolymers also function to provide the desired water-resistance properties in the resulting plaster composition.

The invention being thus described, it will be obvious that the same may be varied in many ways. Such variations are not to be regarded as a departure from the spirit and scope of the invention, and all such modifications are intended to be included within the scope of the following claims.

It is claimed:

1. A plaster composition having water-resistance properties comprising 30 to 60% by weight of calcium sulfate plaster solids, 0.25 to 15% by weight of a low molecular weight resin selected from the group consisting of polyvinyl chloride, polyvinyl acetate, petroleum and coal tar hydrocarbon polymer resins and styrene and acrylic copolymers, 4 to 48% of a substantially water-immiscible organic solvent for said resin and 20 to 50% by weight of water, said organic solvent having the property of evaporating from the composition at a rate similar to the rate of evaporation of water therefrom.

2. A composition in accordance with claim 1, wherein up to 50% by weight of the calcium sulfate plaster solids is replaced by a hydraulic cement.

3. A composition in accordance with claim 1, wherein said resin is a polyindene resin.

4. A composition in accordance with claim 1, wherein said resin is a coumarone-indene resin.

5. A composition in accordance with claim 1, wherein said resin is a petroleum or coal tar hydrocarbon polymer resin having a molecular weight of 800 to 1100.

6. A composition in accordance with claim 1, wherein said resin is a polyindene resin obtained from the polymerization of unsaturates derived from the deep cracking of petroleum polymers derived from the coal tar naphtha fraction boiling between 168°C. and 175°C.

7. A composition in accordance with claim 1, where said resin has a ring and ball melting point of from 80° to 140°C.

8. A composition in accordance with claim 1, wherein said solvent is an aliphatic or aromatic hydrocarbon having a boiling point of about 120° to about 210°C.

9. A composition in accordance with claim 1, wherein said solvent is an aliphatic or aromatic hydrocarbon having a boiling point of from 138° to 181°C.

10. A composition in accordance with claim 1, wherein said solvent is a hydrocarbon having a boiling point of 168° to 175°C.

11. A composition in accordance with claim 1, wherein said solvent is xylene.

12. A composition in accordance with claim 1, wherein said solvent is a coal tar distillate.

13. A composition in accordance with claim 1, further including a cellulose ether as a suspending agent for the resin solution.

14. A plaster composition having water-resistance properties comprising 38.0 to 60% by weight of calcium sulfate plaster solids, 2.0 to 15% by weight of a low molecular weight resin selected from the group consisting of polyvinyl chloride, polyvinyl acetate, petroleum and coal tar hydrocarbon polymer resins and styrene and acrylic copolymers, 4.0 to 15% by weight of a substantially water-immiscible organic solvent for said resin, said organic solvent having the property of evaporating from the composition at a rate similar to the rate of evaporation of water therefrom, and 28.0 to 50% by weight of water, the organic solvent solution of resin being dispersed in the aqueous phase in the composition.

15. A composition in accordance with claim 14, wherein up to 50% by weight of the calcium sulfate plaster solids is replaced by a hydraulic cement.

16. A composition in accordance with claim 14, further including a cellulose ether as a suspending agent for the resin solution.

17. A composition in accordance with claim 14, wherein said solvent is an aliphatic or aromatic hydrocarbon having a boiling point of about 120° to about 210°C.

18. A composition in accordance with claim 14, wherein said solvent is an aliphatic or aromatic hydrocarbon having a boiling point of from 138° to 181°C.

19. A composition in accordance with claim 14, wherein said solvent is a hydrocarbon having a boiling point of 168° to 175°C.

20. The hardened waterproof plaster composition comprising the product obtained by allowing the composition of claim 1 to set to a hardened state.

21. A composition in accordance with claim 1, wherein the plaster solids, resin, organic solvent and water are packaged separately.

22. A compositon in accordance with claim 1, wherein the plaster solids are packaged as one component and one or more of the liquid components is packaged as a separate component.

23. A plaster composition having water-resistance properties comprising 30 to 60% by weight of calcium sulfate plaster solids, 0.25% to 15% by weight of a low molecular weight vinyl toluene-butadiene copolymer resin, 4 to 48% of a substantially water-immiscible organic solvent for said resin and 20 to 50% by weight of water, said organic solvent having the property of evaporating from the composition at a rate similar to the rate of evaporation of water therefrom.

* * * * *